United States Patent [19]

Seki

[11] Patent Number: 5,010,584

[45] Date of Patent: Apr. 23, 1991

[54] MOBILE COMMUNICATION TRANSCEIVER

[75] Inventor: Kenji Seki, Tokyo, Japan

[73] Assignee: NEC Corporation, Japan

[21] Appl. No.: 403,601

[22] Filed: Sep. 6, 1989

[30] Foreign Application Priority Data

Sep. 14, 1988 [JP] Japan ................................. 63-228504

[51] Int. Cl.$^5$ ............................................. H04B 1/44
[52] U.S. Cl. ......................................... 455/83; 455/89;
455/186; 455/226; 455/314; 379/61
[58] Field of Search ...................... 455/78, 82, 83, 89,
455/33, 226, 214, 185, 186, 314, 315; 379/61

[56] References Cited

U.S. PATENT DOCUMENTS

| | | | |
|---|---|---|---|
| 4,137,499 | 1/1979 | Caudel | 455/78 |
| 4,457,018 | 6/1984 | Takayama | 455/33 |
| 4,486,624 | 12/1984 | Puhl et al. | 455/89 |
| 4,585,903 | 4/1986 | Schiller et al. | 455/89 |
| 4,619,002 | 10/1986 | Thro | 455/226 |
| 4,654,882 | 3/1987 | Ikeda | 455/89 |

OTHER PUBLICATIONS

Development of Narrow Band MCA System by Masashi Tanaka et al. NEC Res. & Develop., No. 89, Apr. 1988; pp. 89–101.

Primary Examiner—Reinhard J. Eisenzopf
Assistant Examiner—Andrew Faile
Attorney, Agent, or Firm—Laff, Whitesel, Conte & Saret

[57] ABSTRACT

A mobile communication transceiver includes a controller. The controller includes an A/D converter, a memory, and a CPU. The A/D converter converts an output voltage corresponding to a reception input voltage from the receiver into a digital signal. The memory stores a plurality of predetermined data for determining a speech enable electric field level and a plurality of predetermined data for determining a high electric field level. The CPU determines a speech enable electric field level by comparing the digital signal from the A/D converter with the data stored in the memory. The CPU compares the digital signal supplied from the A/D converter through an interface with the high electric field level determination data stored in the memory when the high electric field level is determined. The CPU selects a determination level of the speech enable electric field level from the plurality of data stored in the memory.

7 Claims, 2 Drawing Sheets

MOBILE COMMUNICATION TRANSCEIVER

BACKGROUND OF THE INVENTION

The present invention relates to a mobile communication transceiver used for a multiple connection access system (to be referred to as an MCA system hereinafter).

In a conventional MCA system employed in Japan, when a non-field condition lasts for more than a predetermined period of time, it is determined that an on-hook condition is satisfied. For this reason, in a mobile radio unit used for the MCA system, a non-field condition is determined by checking whether a given electric field exceeds a certain reference electric field level.

According to another conventional technique, communication is performed by superposing a tone signal on a lower or upper portion of a speech signal band. On a transmitter side, a speech signal is transmitted upon superposion of a tone signal thereon. On the receiver side, the tone signal is detected. If the tone signal is not detected, an on-hook state is determined even if an electric field is present.

According to still another conventional technique, when speech is to be ended, a mobile radio unit transmits an on-hook signal. A radio unit of a callee demodulates and decodes the on-hook signal to determine a speech end.

Of the above-described conventional techniques for determining an on-hook state, in the techniques of determining a non-field condition and superposing a tone signal, since strong waves are present near a repeater station, if a given mobile station approaches the repeater station when a plurality of waves are output from the repeater station, intensity modulation (IM) is performed in the receiver of the mobile station depending on a combination of the plurality of waves. As a result, speech communication cannot be ended by this mobile station due to IM.

In the technique of determining a non-field condition, since an electric field level of the given mobile station at a radio frequency during speech does not become lower than the non-field determination level, the on-hook state cannot be obtained. In the technique of superposing a tone signal, if the same tone signal as that of the given mobile station is superposed on a radio frequency generated by IM during its speech communication, the on-hook state cannot be obtained. However, if the types of tones are increased, errors can be minimized.

In the technique of using an on-hook signal, if the on-hook signal cannot be properly demodulated on the receiver side due to IM, an on-hook state cannot be determined. For example, if an on-hook signal is erroneously converted into different data by signal components due to disturbance from another station, demodulation of an on-hook signal cannot be properly performed.

SUMMARY OF THE INVENTION

The present invention has been made in consideration of the above situation, and has as its object to provide a mobile communication transceiver which can end speech communication by using electric field data from a receiver even in the presence of a strong electric field.

In order to achieve the above object, according to the present invention, there is provided a mobile communication transceiver including a receiver for demodulating a high-frequency signal, a transmitter for modulating a low-frequency signal into the high-frequency signal and amplifying the high-frequency signal, a frequency generator for transmitting a local frequency signal to the receiver in a reception mode and for transmitting the high-frequency signal for generating a transmission frequency signal to the transmitter in a transmission mode, a controller for transmitting data for changing a frequency of the frequency generator and for receiving transmission ON or OFF data to switch transmission and reception modes, and an antenna switch for switching between the receiver and the transmitter, wherein the controller comprises, an A/D converter for converting an output voltage corresponding to a reception input voltage from the receiver into a digital signal, a memory for storing a plurality of predetermined data for determining a speech enable electric field level and a plurality of predetermined data for determining a high electric field level, determining means for determining a speech enable electric field level by comparing the digital signal from the A/D converter with the data stored in the memory, comparing means for comparing the digital signal supplied from the A/D converter through an interface with the high electric field level determination data stored in the memory when the high electric field level is determined, and a CPU for selecting a determination level of the speech enable electric field level from the plurality of data stored in the memory.

DETAILED DESCRIPTION OF THE PREFERRED EMBODIMENT

An embodiment of the present invention will be described below with reference to the accompanying drawings.

Figure 1:
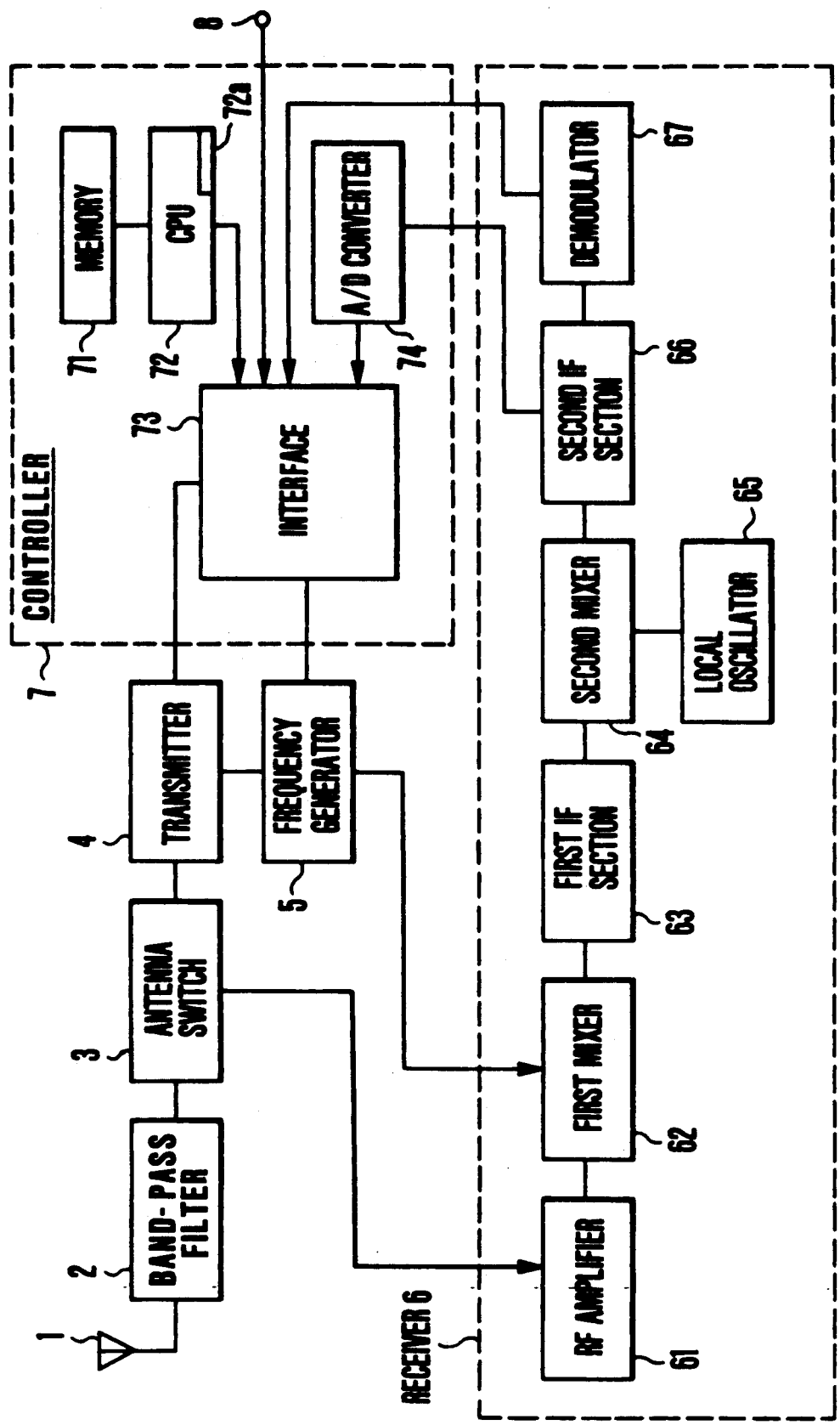
FIG. 1 is a block diagram showing an embodiment of the present invention.

FIG. 1 shows an embodiment of the present invention.

Figure 2:
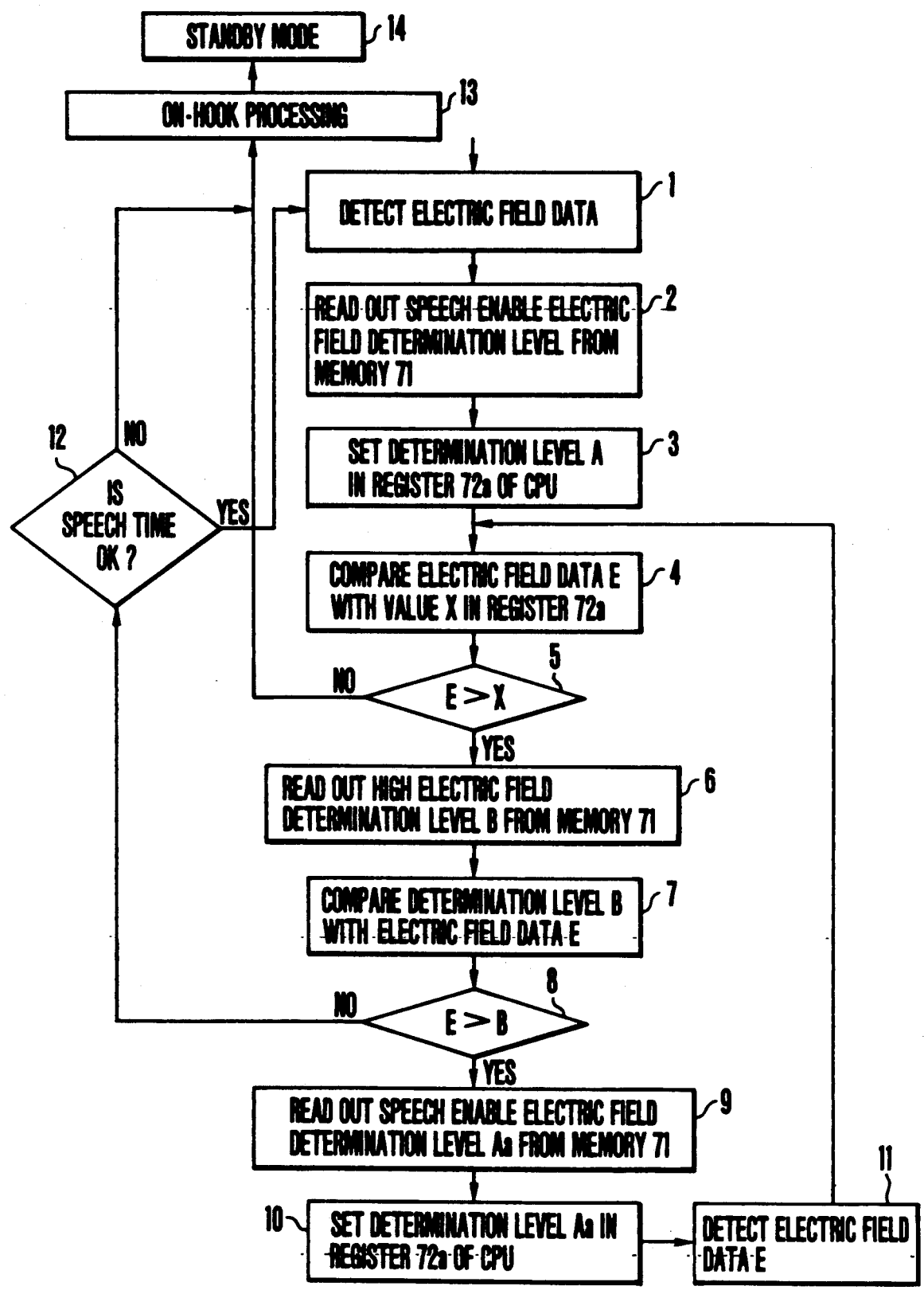
FIG. 2 is a flow chart showing an operation of a controller of the embodiment in FIG. 1.

FIG. 2 shows an operation of a controller of the embodiment in FIG. 1.

Referring to FIG. 1, reference numeral 1 denotes an antenna; 2, a low-pass filter connected to the antenna 1; 3, an antenna switch connected to the low-pass filter 2; 4, a transmitter connected to the antenna switch 3; 5, a frequency generator; 6, a receiver connected to the antenna switch 3, the frequency generator 5, and the transmitter 4; 7, a controller connected to the transmitter 4 and the receiver 6; and 8, a transmission ON data input terminal.

The antenna switch 3 switches between the receiver 6 and the transmitter 4. The transmitter 4 modulates a low-frequency signal to form a high-frequency signal and amplifies it. The frequency generator 5 transmits a local frequency signal to the receiver 6 in a reception mode, and transmits a high-frequency signal for generating a transmission frequency signal to the transmitter 4 in a transmission mode.

The receiver 6 includes an RF amplifier 61 connected to the antenna switch 3, a first mixer 62, a first IF section 63, a second mixer 64, a second local oscillator 65, a second IF section 66, and a demodulator 67. The receiver 6 demodulates a high-frequency signal.

The controller 7 transmits data for changing a frequency to be generated by the frequency generator 5 to the frequency generator, and receives transmission ON or OFF data to switch between transmission and reception modes.

The controller 7 includes an A/D converter 74, a memory 71, and a CPU 72. The A/D converter 74 converts an output voltage into a digital signal in accordance with a reception input voltage from the receiver 6. The memory 71 stores a plurality of predetermined data for determining a speech enable electric field level and data for determining a plurality of high electric field levels. The CPU 72 determines a speech enable electric field level by comparing the digital signal supplied from the A/D converter 74 through an interface 73 with the data stored in the memory 71. In addition, when the high electric field level is determined, the CPU 72 selects a determination level of a speech enable electric field level from the plurality of data stored in the memory 71 by comparing the digital signal supplied from the A/D converter 74 through the interface 73 with the high electric field determining data stored in the memory 71.

An operation of the embodiment will be described below with reference to FIG. 2.

Electric field data E from the second IF section 66 of the receiver 6 is supplied to the controller 7. The data E is then supplied to the CPU 72 through the A/D converter 74 and the interface 73 (step 1). A predetermined speech enable electric field level A is read out from the memory 71 (step 2), and is are set in a register 72a of the CPU 72,(step 3) as a speech enable level X. Thus the level X in the register 72a is a variable representing a plurality of changeable values read from memory 71. The electric field data E is compared with the speech enable level X set in the register 72a (step 4). If $E>X$ (step 5), a predetermined high electric field level B is read out from the memory 71 (step 6) and is compared with the data E (step 7).

If the electric field data E is larger than the high electric field level B (step 8), the determination level of a speech enable electric field level is switched from the level A to another value prestored in the memory 71, i.e., a level Aa is selected (step 9), and the same operation as described above is performed (steps 10, 11, 4). If $E<X$ (step 5), it is determined that a speech end condition is satisfied, and the flow advances to on-hook processing (step 13). Subsequently, the flow returns to a standby mode (step 14). If $E<B$ (step 8), it is checked whether a speech time limit is OK. If YES in step 12 the flow returns to step 1. If NO in step 12, it is determined that a speech end condition is satisfied, and the flow advances to the on-hook processing (step 13). Subsequently, the flow returns to the standby mode (step 14).

FIG. 2 shows only a case wherein the two values A and Aa are used as speech enable determination levels and the value B is used as a high electric field determination level. However, a plurality of values may be respectively used as each of the determination levels. In this case, values B, . . . , and values A, . . . , prestored in the memory 71 as high electric field levels are set in a one-to-one correspondence so as to be combined with each other. The determination levels A and Aa are predetermined in accordance with an amount of noise such as IM.

The above-described operation will be described in detail by setting actual numerical values. For example, the speech enable electric field A is set to be $-5$ dB$\mu$V, and another speech enable electric field level Aa is set to be $+10$ dB$\mu$V. The high electric field level B is set to be $60$ dB$\mu$V. Under such conditions, the flow of an operation will be described below. Assume that the electric field data E from the second IF section 66 is a DC voltage corresponding to 70 $\mu$dB V, e.g., 4V. This voltage of 4V is converted into a digital signal by the A/D converter 74. If the digital signal can be formed as 8-bit data, electric field values of 256 levels can be determined. The 8-bit data corresponding to 70 $\mu$dB V is supplied to the CPU 72. The supplied data is compared with the level A first. Since $+70$ $\mu$dB V $> -5$ dB$\mu$V, the flow advances to the next step to compare the data with the level B. Since $+70$ dB$\mu$V $> +60$ dB$\mu$V, the wave determination level changes from the value A to the value Aa. That is, $+10$ dB$\mu$V is used as a comparison unit. Therefore, if the electric field level E is changed to 0 dB$\mu$V in this state, since 0 dB$\mu$V $< +10$ dB$\mu$V, it is determined that no wave is present.

As has been described above, according to the present invention, a non-field determination level is changed by the controller by using electric field data from the receiver so that speech communication can be ended under a high electric field.

What is claimed is:

1. A mobile communication transceiver including a receiver for demodulating a high-frequency signal, a transmitter for modulating a low-frequency signal into the high-frequency signal and amplifying the high-frequency signal, a frequency generator for transmitting a local frequency signal to said receiver in a reception mode and for transmitting the high-frequency signal for generating a transmission frequency signal to said transmitter in a transmission mode, a controller for transmitting data for changing a frequency of said frequency generator and for receiving transmission ON or OFF data to switch transmission and reception modes, and an antenna switch for switching between said receiver and said transmitter, wherein said controller comprises:

an A/D converter for converting an output voltage corresponding to a reception input voltage from said receiver into a digital signal;

a memory for storing a plurality of predetermined data for determining a speech enable electric field level and a plurality of predetermined data for determining a high electric field level;

determining means for determining a speech enable electric field level by comparing the digital signal from said A/D converter with the speech enable electric field level determination data stored in said memory;

comparing means for comparing the digital signal supplied from said A/D converter through an interface with the high electric field level determination data stored in said memory when the high electric field level is determined; and a CPU for selecting a determination level of the speech enable electric field level from the plurality of data stored in said memory.

2. A transceiver comprising:

receiver means for receiving a radio signal to produce a received radio signal;

field detector means for detecting the electric field level of said received radio signal;

first comparing means for comparing said electric field level with a first level and producing a first detection signal when said electric field level exceeds said first level;

second comparing means responsive to said first detection signal for comparing said electric field level with a second level and producing a second detection signal when said electric field level exceeds said second level, said second level being larger than said first level;

third comparing means responsive to said second detection signal for comparing said electric field level with a third level and producing a third detection signal when said electric field level falls below said third level, said third level being larger than said first level and smaller than said second level; and determining means responsive to said third detection signal for producing a communication end signal.

3. A transceiver as claimed in claim 2, wherein said first comparing means comprises means for producing a first end signal when said electric field level falls below said first level, and wherein said determination means is responsive to said first end signal for producing said communication end signal.

4. A transceiver as claimed in claim 2, wherein said second comparing means comprises means for producing a fourth detection signal when said electric field level falls below said second level, and wherein said transceiver further comprises means responsive to said fourth detection signal for checking to determine whether a predetermined period of time has elapsed and for producing said communication end signal when said predetermined period of time has elapsed.

5. A method of detecting an end of communication of a transceiver, comprising the following steps of:

detecting the electric field level of a radio signal to produce a received level;

comparing said received level with a first level;

producing an end signal indicating said end of communication when said received level falls below said first level;

comparing said received level with a second level which is larger than said first level when said received level exceeds said first level;

comparing said received level with a third level which is larger than said first level and which is smaller than said second level when said received level falls below said second level; and producing said end signal when said received level falls below said third level.

6. A method as claimed in claim 5, further comprising the step of;

producing said end signal when said received level falls below said first level.

7. A method as claimed in claim 5, further comprising the steps of:

determining whether or not said communication lasts for a predetermined period of time when said received level exceeds said second level; and producing said end signal if said communication has lasted more than said predetermined period of time.

* * * * *